United States Patent [19]

Choi

[11] Patent Number: 5,122,865
[45] Date of Patent: Jun. 16, 1992

[54] CHROMA KEY SIGNAL GENERATOR FOR A VIDEO EDITING APPARATUS

[75] Inventor: Hae Y. Choi, Kwonseon, Rep. of Korea

[73] Assignee: SamSung Electronics Co., Ltd., Kyung Ki, Rep. of Korea

[21] Appl. No.: 407,938

[22] Filed: Sep. 15, 1989

[30] Foreign Application Priority Data

Sep. 15, 1988 [KR] Rep. of Korea ............... 1988-15212

[51] Int. Cl.⁵ ........................................... H04N 9/75
[52] U.S. Cl. ............................................. 358/22
[58] Field of Search ............................. 358/22, 28

[56] References Cited

U.S. PATENT DOCUMENTS 4,122,490  10/1978  Lish ........................... 358/22
4,953,011   8/1990  Mori et al. ................. 358/28

FOREIGN PATENT DOCUMENTS 1333885 10/1973 United Kingdom ............... 358/22
2044036 10/1980 United Kingdom .

Primary Examiner—James J. Groody
Assistant Examiner—David E. Harvey
Attorney, Agent, or Firm—Robert E. Bushnell

[57] ABSTRACT

A chroma key signal generator for a video editing apparatus which enables a chroma key signal to be obtained from a composite video signal. The chroma key signal generator includes a color selecting circuit which provides one or more chrominance subcarrier signals having predetermined phase differences from the chrominance subcarrier signal separated from a color video signal, selects one among the chrominance subcarrier signals and provides a specific chrominance signal by adjusting the phase of the selected chrominance subcarrier signal, and a phase detecting circuit which compares the phases of the selected chrominance signal and the chrominance signal separated from the color video signal and provides the chroma key signal when the phases of the chrominance signals are detected to be the same.

6 Claims, 4 Drawing Sheets

CHROMA KEY SIGNAL GENERATOR FOR A VIDEO EDITING APPARATUS

BACKGROUND OF THE INVENTION

1. Field of the Invention

The present invention relates to a chroma key signal generator for a video editing apparatus, and more particularly to a chroma key signal generator which enables the chroma key signal to be obtained from a composite video signal.

2. Description of the Prior Art

In general, a chroma key apparatus which is a kind of video editing apparatus includes a chroma key signal generator for providing a chroma key signal in response to specific hues of the chrominance signal of the color video signals, and a selection switch for selecting one among two or more chrominance signals according to this key signal, so that two or more color video signals can be mixed.

In the conventional chroma key signal generator of the above type, the chroma key signal is generated by utilizing three primary color signals of red(R), green(G) and blue(B). However, it is not possible to use the chroma key signal generators for VCRs and/or a color TV set as the primary color signals R, G and B are not attainable in the video cassette recorder or the color TV set which process the composite video signals as color difference signals. Accordingly, at least one additional video camera is required to generate a chroma key signal, and thereby the conventional chroma key signal generators are subjected to restriction in use.

SUMMARY OF THE INVENTION

It is an object of the present invention to provide a chroma key signal generator for a video editing apparatus, by which the chroma key signal can be obtained from the composite video signal, thus having extended the range of use.

In accordance with the present invention, there is provided a chroma key signal generator for a video editing apparatus comprising: chrominance signal separating means for separating a chrominance signal from a color video signal; color synchronizing means for providing successive chrominance subcarrier signals by detecting the color synchronizing signal from the chrominance signal; color selecting means providing one or more chrominance subcarrier signals having predetermined phase differences from the chrominance subcarrier signal respectively, selecting and providing a specific chrominance signal by adjusting the phase of the selected chrominance subcarrier signal; and phase detecting means comparing the phase of the specific chrominance signal selected in the color selecting means with that of the chrominance signal provided from the chrominance signal separating means and providing the maximum output as a chroma key signal when the phases of the chrominance signals are detected to be the same in the above comparison.

DETAILED DESCRIPTION OF THE PREFERRED EMBODIMENT

Figure 1:
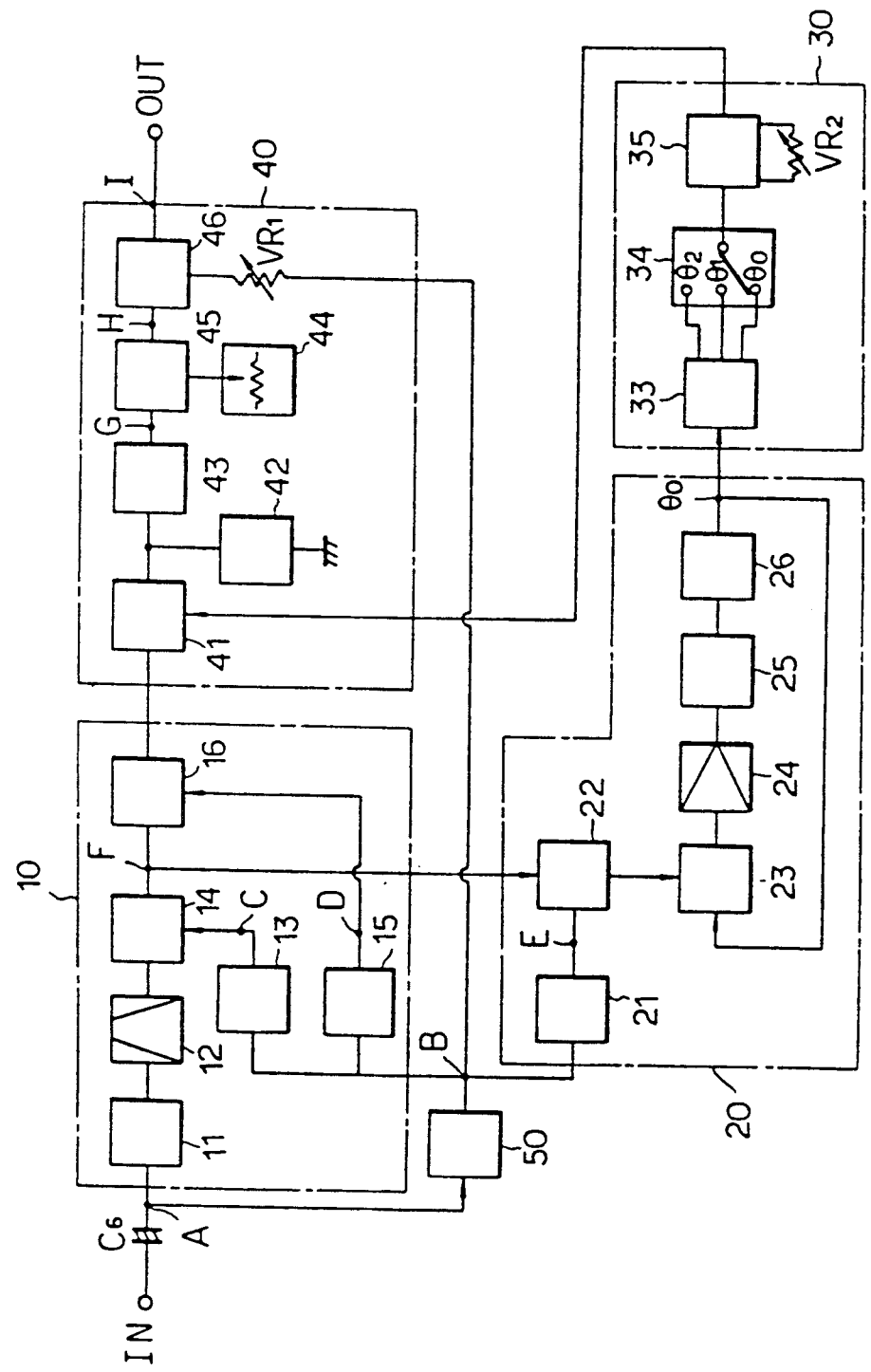
FIG. 1 is a block diagram of a preferred embodiment according to the present invention.

Referring to FIG. 1 of the drawings, the color video signal (FIG. 4-A) which is supplied to the input terminal IN is provided to both a chrominance signal separating circuit 10 and a synchronizing signal separating circuit 50 via a coupling capacitor C6 respectively.

As shown in FIG. 1, chrominance signal separating circuit 10 comprises a buffer 11, a band pass filter 12, a clamp pulse generator 13, an amplifier 14, a blanking pulse generator 15 and a blanking circuit 16.

Chrominance signal separating circuit 10 allows only the color signal component of the chrominance subcarrier signal (3.58 MHz) of the composite video signal, which is provided via buffer 11, to pass through band pass filter 12.

Chrominance signal separating circuit 10 compensates the gain of the color signal lowered in the above filtering process while proving the impedance matching, and clamps the chrominance signal (FIG. 4-F) which is separated through amplifier 14. Amplifier 14 fixes the color signal at a constant level in reliance upon the clamp pulse (FIG. 4-C) received from the clamp pulse separator 13 such as monostable multivibrator generating the clamp pulse, by using the synchronizing signal (FIG. 4-B), supplied from the synchronizing signal separator 50 as a trigger signal.

The clamped chrominance signal (FIG. 4-F) is passed through blanking circuit 16 which receives the blanking pulse (FIG. 4-D) from blanking pulse generator 15. Blanking pulse generator 15 maybe a two-stage monostable multivibrator. Blanking circuit 16 passes the blanking pulse only during the effective chrominance signal period. Thus it is possible to supply only the chrominance signal with a stable phase to phase detecting circuit 40, which will be described later.

As can be seen in FIG. 1, phase detecting circuit 40 comprises a phase comparator 41, a 3.58 MHz trap circuit 42, an integrating amplifier 43, a color saturation selecting circuit 44, a level comparator 45 and a mixer 46.

The clamped chrominance signal (FIG. 4-F) is also supplied to color synchronizing circuit 20.

As shown in the drawing, color synchronizing circuit 20 comprises a color synchronizing gate pulse generator 21, a color synchronizing gate circuit 22, a phase comparator 23, an amplifier 24, an integrator 25 and a voltage controlled oscillator 26.

Color synchronizing circuit 20 picks up only the color synchronizing signal via color synchronizing gate circuit 22 which is adapted to pass only the color synchronizing signal in response to the synchronizing gate pulse (FIG. 4-F) received from the color synchronizing gate pulse generator such as the two-stage monostable multivibrator generating the color synchronizing gate pulse with the synchronizing signal of synchronizing signal separator 50 to be the trigger signal, and obtain the chrominance subcarrier signal from the phase-locked loop circuit comprising phase comparator 23, amplifier 24, integrator 25 and voltage-controlled vibrator 26, signal then being supplied to color selecting circuit 30.

Color selecting circuit 30 comprises phase shifting means 33, selection switch means 34 and phase adjusting means 35. The color selecting circuit 30 outputs one or more chrominance subcarrier signals having a certain phase difference in comparison to the chrominance subcarrier signal which is provided through phase shifting means 30, and one of those chrominance subcarrier signals is selected by selection switch means 34.

Additionally, color selecting circuit 30 also selects the specific chrominance signal by means of fine phase adjustment in phase adjustment means 35 on the selected signal and then supplies the selected signal to phase detecting circuit 40.

Figure 2:
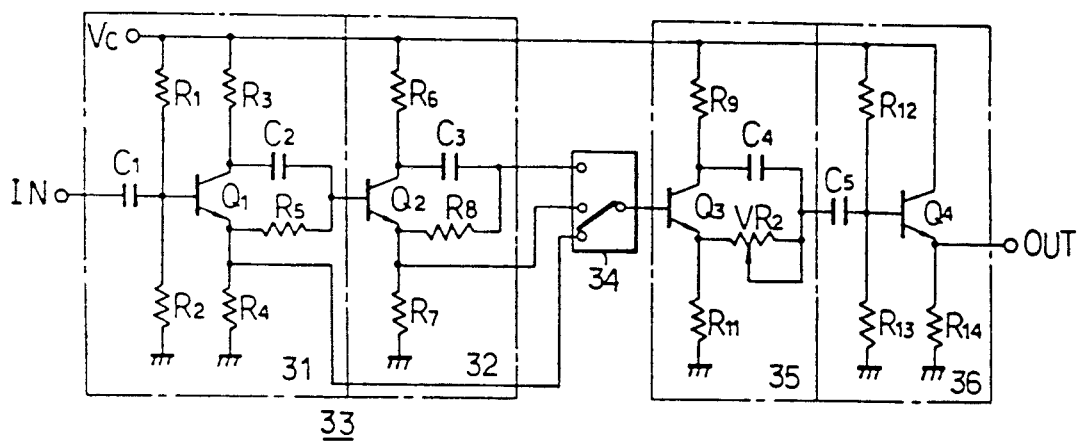
FIG. 2 is a circuit diagram of the chrominance selecting circuit according to the present invention.

One example of color selecting circuit 30 is shown in FIG. 2.

As shown in FIG. 2, phase shifting means 33 obtains a chrominance subcarrier signal having the same phase $\theta_0$ as the provided chrominance subcarrier signal in the emitter output of the transistor Q1 in first phase shifting circuit 31. Also, phase shifting means 33 obtains the first chrominance subcarrier signal having the phase difference $\theta_1$ of 120° in the emitter output of transistor Q2 by applying the collector output signal, the phase of which is inverted as much as 180° from that of $\theta_2$ to the base of the second stage phase shifting circuit 32 via a capacitor C2 which serves as the delay means for delaying 60° of the phase, and then obtains the second chrominance subcarrier signal having the phase difference $\theta_2$ of 120° in comparison to the first chrominance subcarrier signal by passing the collector output signal which is inverted by 180° from the phase $\theta_1$ of the first chrominance subcarrier signal through a capacitor C3 which serves as the delay means for delaying 60° of the phase.

Therefore, the chrominance subcarrier signal with the phase $\theta_0$, the first and second chrominance subcarrier signals with phases $\theta_1$ and $\theta_2$ are applied to each terminal of selection switch means 34, respectively. The chrominance subcarrier signal which is selected in selection switch means 34 is applied to the phase adjusting means, for example, phase shifting circuit 33 in which the phase shift $\phi$ may be denoted by the following equation:

$$\phi = 2\tan^{-1}(1/(2\pi \cdot f \cdot VR2 \cdot C2))$$

According to the change of the resistance value of the variable resistor VR2, the selective phase $\theta$ of the signal $X(\theta)$ is defined as follows:

$$\theta = \theta n \pm \phi (n = 0, 1, 2)$$

Figure 3:
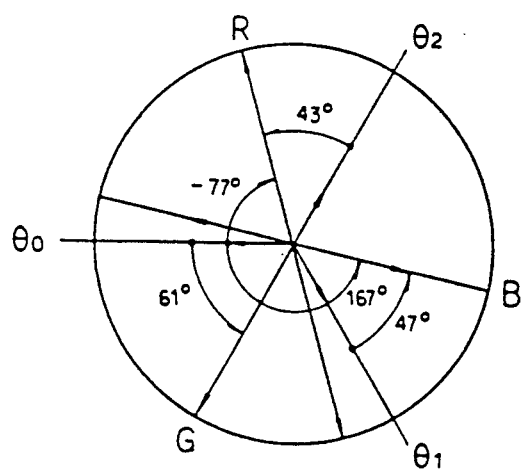
FIG. 3 is a vector diagram of the chrominance signal for explaining the chrominance selecting circuit of the present invention.

Now, referring to FIG. 3, when selection switch means 34 selects the chrominance subcarrier signal with phase $\theta_1$ and adjusts the variable resistor VR2 in order to delay the phase by 59° as shown in FIG. 2, the green color G is selected as the specific hue as shown in FIG. 3. This signal selected with the specific phase is supplied to phase detecting circuit 40 through buffer 36.

Phase detecting circuit 40 applies the output signal of phase comparator 41, for example, comprising a multiplexer and a tuned circuit, to integrating amplifier 43 via the 3.58 MHz trap circuit 42, the phase comparator being adapted to compare the phases of the chrominance signal supplied from chrominance signal separating circuit 10 and the specific chrominance signal which is selected in color selecting circuit 30 and generates the maximum output when the two signals have the same phase. The integrating amplifier 43 integrates the A.C. signal in order to obtain a mean value signal (FIG. 4-G), which is then amplified and applied to level comparator 45.

Figure 4:
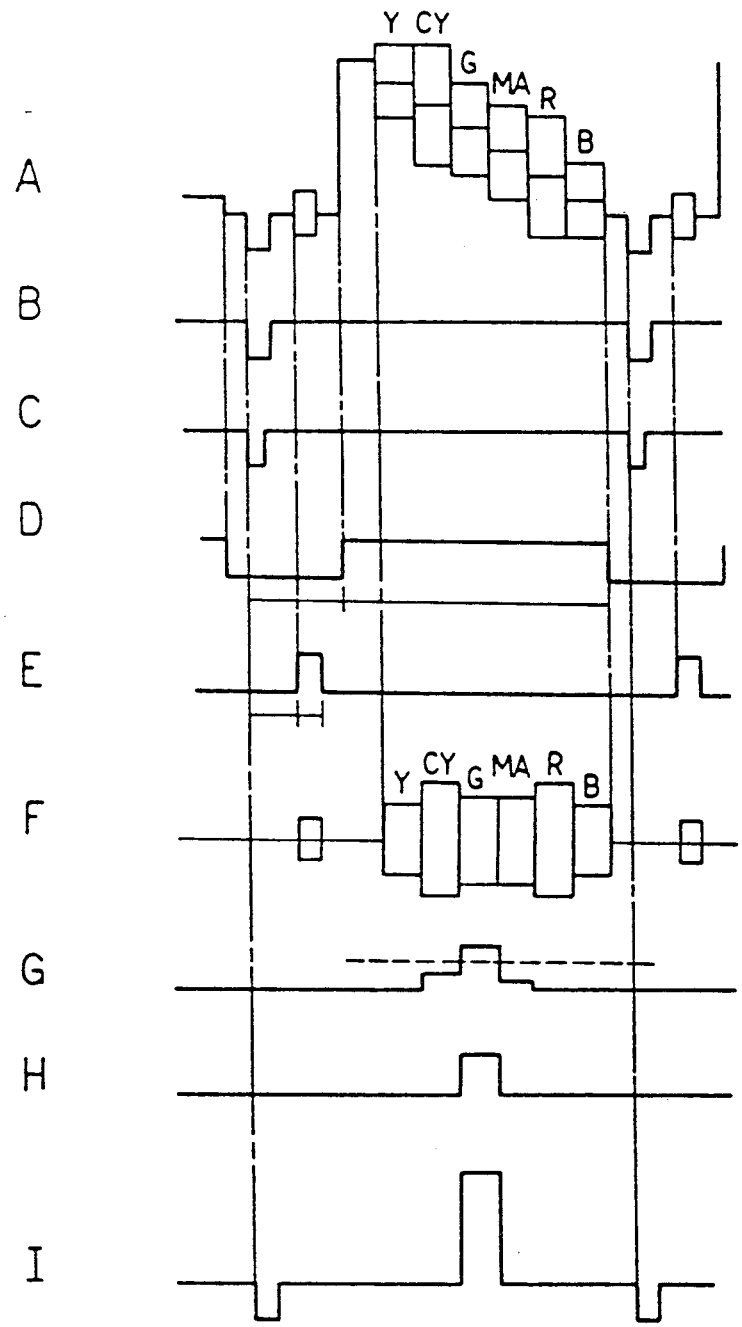
FIG. 4 is a waveform diagram for dipicting the waveforms appearing at various points in FIG. 1.

Level comparator 45 compares the level of the mean value signal (FIG. 4-G) with that of the reference signal (shown by dashed line in FIG. 4-C) from color saturation selecting means 44, so that when a signal with a color saturation above a certain level is detected even if the signal and the rest have the same phase, it generates the output signal (FIG. 4-H) as the chroma key signal. This chroma key signal is supplied to mixer 46 in order to be synchronized with the video signal and mixed therein with the synchronizing signal, being supplied from synchronizing signal separating circuit 50 through a variable resistor VR1, to output a chroma key control signal (FIG. 4-I).

Figure 5:
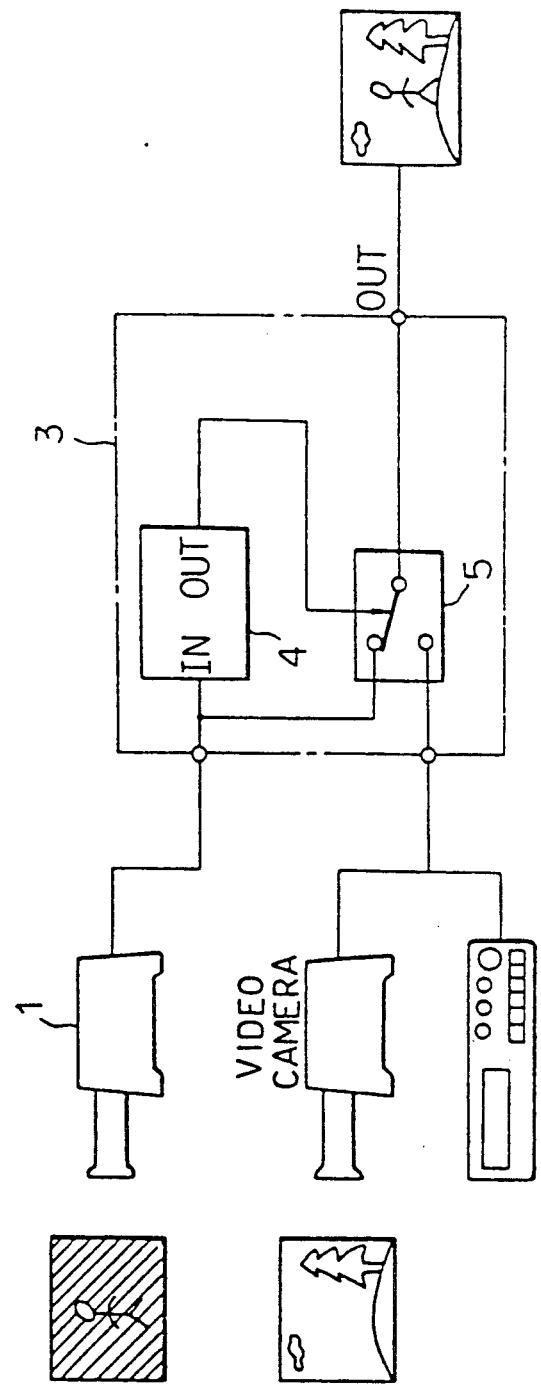
FIG. 5 is a schematic view for explaining the conventional chroma key apparatus.

Referring to FIG. 5 showing conventional chroma key apparatus 3 having a chroma key signal generator 4 and a selection switch 5, chroma key signal generator 4 can provide the chroma key signal by utilizing three primary color signals from at least one additional video camera 1, and thus it is impossible to use conventional chroma key signal generator 4 for video cassette recorders and/or a color television set.

From the foregoing, it is apparent that the present invention provides a chroma key signal generator for a video editing apparatus which produces the chroma key signal only when a chrominance signal with a color saturation above a certain level and the same phase as that of the specific chrominance signal input; the chrominance signal is and detected by comparing the phase of the specific color signal, which is selected with reference to the phase of the color synchronizing signal, which in turn is obtained from the composite video signal with the input chrominance signals.

Therefore, the chroma key apparatus according to the present invention makes it possible to edit the video signals by using only a video cassette recorder and another video cassette recorder, or a color television set and a video cassette recorder, without the necessity of using a video camera.

Furthermore, since the chrominance signal separating circuit and the color synchronizing circuit are included in the existing video cassette recorders and color television sets, the chroma key function can be adopted easily and at a low cost with those or similar appliances.

What is claimed is:

1. A chroma key signal generator for a video editing apparatus comprising:
    chrominance signal separating means for separating a chrominance signal from a color video signal;
    color synchronizing means for providing successive chrominance subcarrier signals with constant phase and frequency in response to a color synchronizing signal from said chrominance signal;
    color selecting means for generating a plurality of chrominance subcarrier signals each having a respective different predetermined phase and for selecting one of said plurality of chrominance subcarrier signals, said color selecting means providing a specific chrominance output signal by adjusting the phase of the selected chrominance subcarrier signal; and
    phase detecting means for comparing the phases of said chrominance signal provided from said chrominance signal separating means and said specific chrominance output signal and for providing a chroma key signal when the phases of said chrominance signal provided from said chrominance signal separating means and said specific chrominance output signal are detected to be the same.

2. The chroma key signal generator of claim 1, wherein said color selecting means comprises:
   phase shifting means for providing said plurality of chrominance subcarrier signals;
   selection switch means for selecting said one of said plurality of chrominance subcarrier signals; and
   phase adjusting means for providing said specific chrominance output signal by adjusting the phase of the selected chrominance subcarrier signal.

3. The chroma key signal generator of claim 1, wherein said phase detecting means comprises:
   a phase comparator for comparing the phases of said chrominance signal provided from said chrominance signal separating means and said specific chrominance output signal and providing a maximum output in the case that they have the same phase;
   an integrating amplifier for amplifying and integrating an output of said phase comparator;
   a level comparator for providing said chroma key signal by comparing the level of said D.C. signal with a reference level; and
   a mixer for mixing said chroma key signal with a synchronizing signal separated from said color video signal.

4. The chroma key signal generator of claim 2, wherein said phase shifting means comprises:
   a first transistor for receiving said chrominance subcarrier signal provided from said color synchronizing means at its base and for providing a first one of said plurality of chrominance subcarrier signals at its emitter, and having a first capacitor connected to its collector for providing a first delayed subcarrier signal;
   a second transistor for receiving at its base said first delayed subcarrier signal and for providing a second one of said plurality of chrominance subcarrier signals at its emitter, and having a second capacitor connected to its collector for providing a second delayed subcarrier signal as a third one of said plurality of chrominance subcarrier signals.

5. The chroma key signal generator of claim 4, wherein said selection switch means comprises:
   a first input terminal connected to said first chrominance subcarrier signal;
   a second input terminal connected to said second chrominance subcarrier signal; and
   a third input terminal connected to said third chrominance subcarrier signal; and
   an output terminal for providing one of said first, second or third chrominance subcarrier signals to said phase adjusting means.

6. The chroma key signal generator of claim 5, wherein said phase adjusting means comprises:
   a third transistor having a base connected to said output terminal of said selection switch means, an emitter, and a collector;
   a third capacitor connected in series with a variable resistor, wherein said third capacitor is further connected to said collector of said third transistor and said variable resistor is connected to said emitter of said variable transistor; and
   a fourth transistor having a base connected to a node between said third capacitor and said variable resistor via a fourth capacitor, and having an emitter for providing said specific chrominance output signal to said phase detecting means.

* * * * *

UNITED STATES PATENT AND TRADEMARK OFFICE
CERTIFICATE OF CORRECTION

PATENT NO. :   5,122,865
DATED      :   16 June 1992
INVENTOR(S) :  Hae-Yong CHOI It is certified that error appears in the above-identified patent and that said Letters Patent is hereby corrected as shown below:

Column 2,   Line 4,   replace "dipicting" with --depicting--.

Column 4,   Line 32,  delete "and".

Signed and Sealed this

Third Day of August, 1993

Attest:

MICHAEL K. KIRK

*Attesting Officer*          *Acting Commissioner of Patents and Trademarks*